May 31, 1927.
J. H. BUCKNAM
BLOWPIPE TIP
Filed Sept. 1, 1922
1,631,007
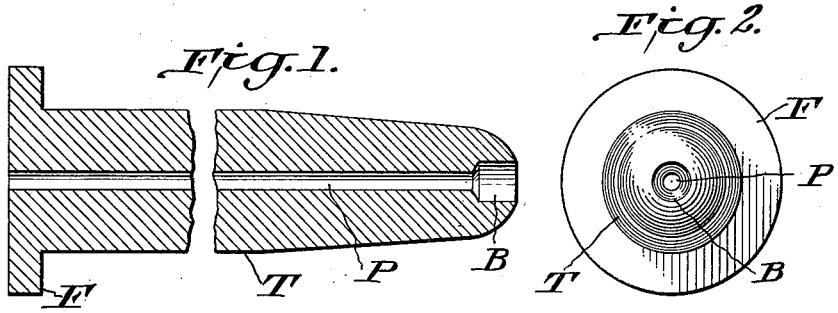
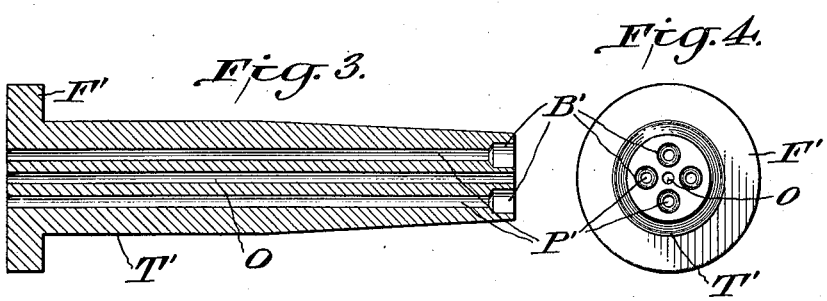
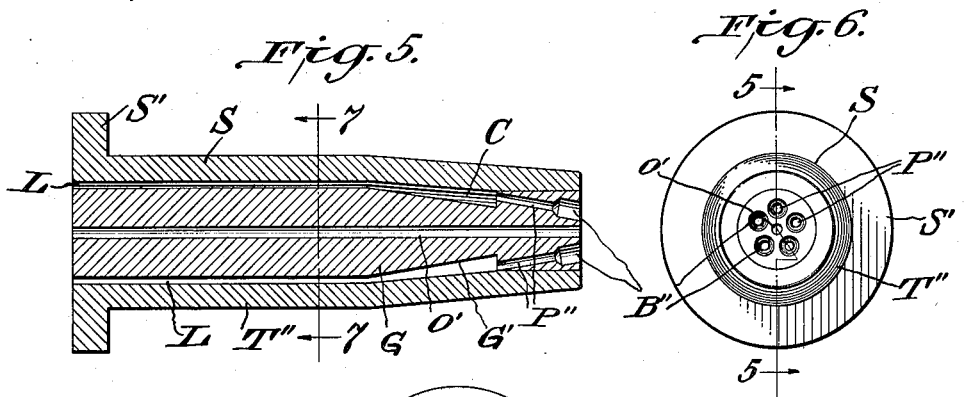
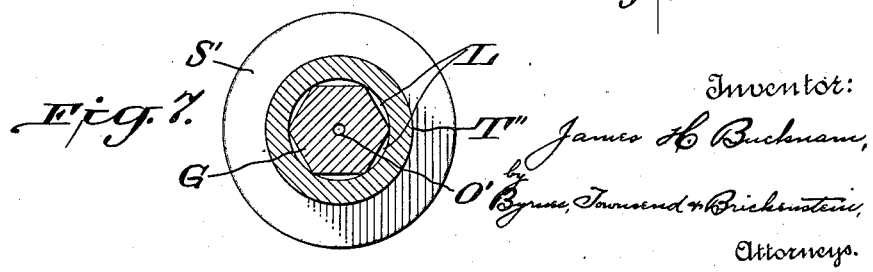
Inventor:
James H. Bucknam,
by O'Byrne, Townsend & Brickenstein,
Attorneys.

Patented May 31, 1927.

1,631,007

UNITED STATES PATENT OFFICE.

JAMES H. BUCKNAM, OF JERSEY CITY, NEW JERSEY, ASSIGNOR, BY DIRECT AND MESNE ASSIGNMENTS, OF ONE-HALF TO THE LINDE AIR PRODUCTS COMPANY, A CORPORATION OF OHIO, AND ONE-HALF TO THE HARRIS CALORIFIC COMPANY, OF CLEVELAND, OHIO, A CORPORATION OF OHIO.

BLOWPIPE TIP.

Application filed September 1, 1922. Serial No. 585,785.

This invention relates to blowpipes and particularly to improved tips therefor.

Fuel gas passages or bores of blowpipe tips have heretofore been either of uniform diameter or contracted at their outlet orifices. These passages are usually arranged in the axes of welding tips, while in cutting tips an oxidizing passage is usually arranged in the axis of the tip and one or more preheating, or fuel gas passages are disposed substantially parallel or at a slight angle of from 1 to 2 degrees to the central passage. Fuel gases, such as a mixture of acetylene and oxygen, have generally been used in welding and cutting blowpipes equipped with such tips, but when other fuel gases having a slower rate of combustion and a lower flame temperature are employed in such tips, the results obtained are not entirely satisfactory because of the difficulty of concentrating the flames on a common center and also because of the tendency of the flame to blow out when sufficient oxygen is used to insure rapid preheating in a cutting torch or a high heat in welding torches.

The primary object of this invention is, therefore, to provide a blowpipe tip adapted to produce a more satisfactory welding or preheating jet, especially when fuel gases are used which have a lower flame temperature and slower rate of combustion than acetylene.

The above and other advantages and the novel features of the invention will be apparent from the following description taken in connection with the drawings in which Figs. 1 and 2 are respectively a central sectional view and an end view of a welding tip embodying the present invention. Figs. 3 and 4 are respectively a central sectional view and an end view of a cutting tip embodying the present invention, and Figs. 5, 6 and 7 are respectively a central sectional view, an end view, and a cross sectional view of another cutting tip embodying this invention.

The welding tip T illustrated in Figs. 1 and 2 may consist of a copper, brass or other suitable body having the usual flange or shoulder F at one end whereby it may be coupled to a welding blowpipe head in a well known manner. A fuel gas passage or bore P, which may be of substantially uniform cross-section, extends axially longitudinally through the body of the tip and is adapted to receive the usual combustible mixture at its entrance from the blowpipe head. Heretofore this passage has been of a uniform diameter in some types of tips and in others the diameter of the passage at the outlet orifice has been contracted. According to the present invention a counterbore B is drilled into the tip to produce an outlet orifice for the passage P that is coaxial with as well as similar and larger in section than the main portion of the passage. This counter-bore B provides an abrupt enlargement that is desirably about twice the diameter of the main part of the passage P and about as deep as the diameter of the counterbore, but may be made of other dimensions.

The cutting tip T' illustrated in Figs. 3 and 4 consists of a body of brass or copper and is also provided with a suitable shoulder or flange F' whereby it may be coupled to the head of a cutting blowpipe so that a central passage O therein will communicate with means for supplying a suitable oxidizing gas such as oxygen, and so that the inlets of the passages P' may communicate with suitable fuel gas supplying means. The heating or fuel gas passages P' are grouped around the central passage O in the same tip body and may be disposed parallel thereto to supply a circular series of jets around the oxidizing jet to preheat the metal to be cut by the oxidizing jet. Each of the passages P' is counterbored at its orifice end as at B' to provide an enlarged outlet orifice or recess for each preheating passage adjacent and in the same face of the tip body with the outlet orifice of the oxidizing gas passage. The delivery end of each passage P' opens substantially centrally into its recess, that is to say, at a point about midway between the inner and outer edges of such recess. The dimensions of these individual counterbbores or recesses B' may correspond to the one illustrated in Figs. 1 and 2 already described.

The cutting tip T'' illustrated in Figs. 5, 6 and 7 comprises a hollow copper or brass shell S provided with a flange S' whereby it may be coupled to a head of a cutting blowpipe. A brass or copper plug G fits tightly into the shell S and is provided with a central passage O' for oxidizing gas.

Other passages for fuel gas may be grouped around the oxidizing gas passage O' to provide a series of preheating jets around the outlet orifice of the oxidizing gas passage. As illustrated, passages for fuel gas may be formed by milling off longitudinal portions of the cylindrical surface of the plug G so that when the latter is fitted in the shell S longitudinal passages L will be formed extending from the head end of the tip into the shell. The plug G is desirably turned down and tapered to an abrupt shoulder, as at G', to provide an annular groove forming a mixing chamber C within the tip. A series of separate heating or fuel gas passages P'' are drilled through the plug from the chamber C to the outer end of the plug and are desirably inclined to the axis of the plug so that the gas jets therefrom may be concentrated more closely to the oxidizing jet from the oxidizing gas passage O'. The gas passages P'' are severally counterbored, in the manner previously described, to provide an enlarged individual outlet orifice for each passage. By inclining the passages P'' to the passage O' it is possible to project the preheating jets closer to the cutting jet, affording a more satisfactory operation of the blowpipe at a less expenditure of heat and gas. The outlet orifices of the heating jets and oxidizing jets are desirably disposed in the end face of the tip. In all types of tips there is a sudden expansion of the outer envelope of gas as it passes from the main passage of smaller substantially uniform bore abruptly into the counterbore, producing a decrease in jet velocity of this outer envelope and a softer flame.

I claim:

1. A blowpipe tip having an oxidizing gas passage and a heating gas passage, both passages extending to the end of said tip, the outlet orifices of said passages being disposed near one another and one of said orifices being counterbored.

2. A tip for cutting blowpipes having an oxidizing gas passage and a heating gas passage inclined thereto and terminating in a counterbore adjacent the outlet orifice of said oxidizing gas passage.

3. A blowpipe tip comprising a central gas passage and other gas passages counterbored to provide separate enlarged outlet orifices adjacent the outlet orifice of said central passage.

4. A tip for cutting blowpipes having a central oxidizing gas passage and heating gas passages inclined toward said central passage and severally counterbored at their outlet orifices which are adjacent the outlet orifice, of said central passage.

5. A blowpipe tip having a plurality of gas passages, the delivery end of each passage discharging into a recess formed within and extending rearwardly from the forward end of the tip, such delivery end opening into such recess at a point about midway between the inner and outer edges of such recess.

6. A blowpipe tip having a plurality of gas passages, the delivery end of each passage discharging centrally into a circular recess formed within and extending rearwardly from the forward end of the tip.

7. A tip for cutting blowpipes, such tip comprising an oxidizing gas passage having its outlet orifice at the end of said tip, and a heating gas passage having a counterbored outlet orifice adjacent the outlet orifice of said oxidizing gas passage.

8. A tip for cutting blowpipes having means cooperative with means for coupling such tip to a head or the like, said tip also having an oxidizing gas passage and a heating gas passage, the outlet orifices of said passages being disposed near one another and the outlet orifice of said heating passage being counterbored.

9. A tip for cutting blowpipes comprising a shell having means cooperative with means for coupling said tip to a blowpipe head, and a plug in said shell having an oxidizing gas passage and a heating gas passage, the outlet orifices of said passages being disposed near one another and the outlet orifice of said heating passage being counterbored.

10. A cutting blowpipe tip provided with a central passageway for cutting oxygen extending to the lower end thereof and a plurality of preheating passageways surrounding the first mentioned passageway, the delivery end of each preheating passageway discharging into a recess formed within and extending upwardly from the lower end of the tip and about midway between the inner and outer edges of such recess, the upper end of said recess extending above the delivery end of the cutting oxygen passageway.

In testimony whereof, I affix my signature.

JAMES H. BUCKNAM.